Patented Feb. 20, 1934

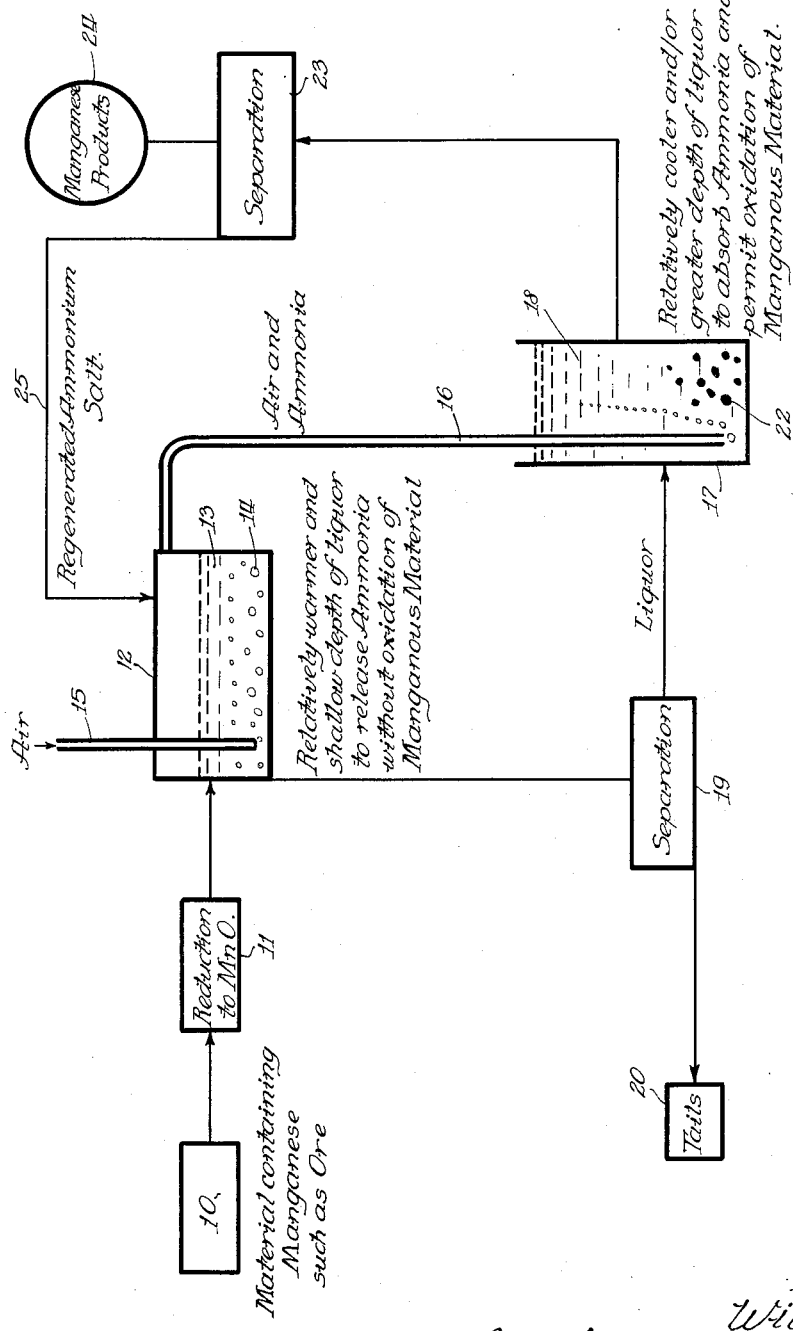

1,947,457

UNITED STATES PATENT OFFICE 1,947,457

WINNING MANGANESE VALUES

Wilson Bradley, Deerwood, Minn., assignor to Bradley-Fitch Company, Duluth, Minn., a corporation of Minnesota Application January 10, 1930. Serial No. 419,817

5 Claims. (Cl. 23—145)

The present invention relates to the extraction of manganese material from other material with ammonium salt solutions and particularly to the injection of gas, such as air, into the extraction for the removal of ammonia which is formed, without serious interference with the extraction, particularly by oxidation of manganous material to form an insoluble product.

It is known that manganous oxide may be dissolved from material containing it by using an ammonium salt solution, forming ammonia, and removing or destroying the formed ammonia to prevent it being effective by its presence in the solution to retard or stop the digesting or dissolving action. In certain co-pending applications, Serial No. 154,369, filed December 13, 1926, Serial No. 219,545, filed September 14, 1927, and Serial No. 276,221, filed May 9, 1928, I have shown improvements in the process, particularly in using a considerable excess of ammonium salt, such as ammonium sulphate. The original and improved process of digestion involves the heating of the extracting mass during the whole or part, preferably the end part of the digestion, for removing the ammonia. Ammonia gas is soluble in liquid and the less so the higher the temperature and the lower the pressure.

Manganous solutions may be treated with ammonia and a manganous hydrate may be precipitated, which however, is soluble in ammonium salts. Manganic solutions may be treated with ammonia and a manganic hydrate precipitated which is not soluble in the presence of ammonium salts. Consequently, in carrying out the digestion of material containing manganous oxide with ammonium salts to form soluble manganous salts, and incidentally ammonia, it has been the aim to prevent the entry of oxygen thereby to prevent oxidation of manganous material and its consequent precipitation as an insoluble manganic hydrate in the digestion process. This condition operates against leaching manganese material from the solid form into a soluble salt which is separable from the residual solid.

The present invention is based upon the discovery that the precautions for excluding oxygen, or air, are not fully justified, and that there are conditions where its presence may be permitted, and where its introduction is beneficial to the conduct of the digestion.

One object of the invention is the injection of gas into the digestion mass to remove ammonia therefrom.

A particular object is the removal of ammonia by injection of gas which is ineffective to impair the efficiency of the digestion of manganous oxide.

Still another object is the introduction of oxygen into the digestion to effect oxidation of ferrous iron without impairing the efficiency of digestion of manganese. Still another object is to carry out the digestion at temperatures lower than have heretofore been required to remove the ammonia.

Various other objects and advantages of the invention will become apparent from the following description of the process as hereinafter described with reference to the extraction of manganese as a soluble manganous salt from minerals containing manganese oxides.

A diagrammatic representation of the preferred embodiment of the process is contained in the accompanying drawing.

The invention is based upon the discovery that when the ammonia content of the digestion liquor is below a certain limit, predetermined by the several prevailing factors which affect the process, air or oxygen can be introduced into the liquor without undue oxidation of the manganous material. At the same time any ferrous iron present may be oxidized to ferric iron. There is thus a selective oxidation.

In the conduct of digestion heretofore it has been the practice to use high temperatures or boiling temperatures to drive out the ammonia, thus to keep the ammonia content sufficiently low.

According to the discovery on which this invention is based, a low concentration of ammonia may be maintained by bubbling air through the digestion, the gas serving to carry off the ammonia. The nitrogen of the air is of course inactive, and the oxygen of the air is practically inactive as to the manganous material, but may be active, advantageously on the ferrous material.

The ammonia content must be low to permit successful digestion at a commercial efficiency. In digestion without air, I have used an ammonium sulphate digestion liquor, containing the sulphates of ammonia and manganese equivalent to a 10% solution of ammonium sulphate, with a proportion of 15 parts of ammonium sulphate to 1 part of manganese (Mn) in ore to be extracted. Such a digestion at 212° F. is not efficient or practical if the ammonia content is above .04 to .06 gms. free ammonia per 100 cc. of solution, or at substantially .05% free ammonia. The solution is too cool to digest at that concentration of ammonia. One way to remedy the condition is to raise the temperature in order to lower the ammonia content or capacity by removing ammonia.

The depth of liquor has a great influence on the ammonia content and must be considered as one of the factors in the process. The bottom layers are at a greater pressure than top layers and therefore have a greater ammonia capacity. Conditions may be such that the average ammonia content indicates digestion my occur, but the truth may be that it will occur at the top, but not occur at the bottom. Greater ammonia concentration in the bottom layers may even cause precipitation of material digested in the top layers.

To eliminate or minimize the above condition I prefer to operate with a small depth of liquor. I have used depths of eighteen (18) inches, of twelve (12) inches and even as low as one half (½) inch. The shallower the depth, the cooler the process may be operated.

Gas or air is employed to carry off the ammonia. I have been able to operate the process at 100° F. with twelve (12) inch depth of liquor at an 80% efficiency in extraction. With a one half (½) inch depth of liquor, and injected air I have operated the process at 85% efficiency at 85° F.

The material which should be treated to extract manganese should contain a reduced manganese compound. I usually heat the material under reducing conditions to insure formation of manganous oxide which is readily digested to form manganous sulphate and ammonia with an ammonium sulphate solution. Iron compounds may also be present, some ferrous oxide (FeO), and some magnetic oxide ($Fe_3O_4$) may be formed. The ferrous oxide is more soluble in the leaching solution than the magnetic oxide, a large portion of which may remain undissolved while the manganous oxide dissolves. Ferrous sulphate may be formed, but the air or oxygen is effective to oxidize this to a ferric condition, and the slight amount of ammonia present causes a precipitation of a ferric hydrate. There is therefore a separation of manganese sulphate solution and iron compounds, resulting in recovery on separation of a clearer and purer solution of manganus sulphate.

As a specific example of my invention I use Minnesota ore containing silica, hematite, limonite, magnetite, psilomelane and pyrolusite, analyzing in part:

| | |
|---|---|
| Manganese | 19.32% |
| Iron | 24.34% |
| Silica | 25.07% |
| Calcium | Trace |

The ore may be heated and reduced with carbon monoxide and steam at 450° C. with the formation of manganous oxide and magnetic oxide of iron.

A 10% digestion liquor of ammonium sulphate is prepared. This may be used in amount to provide fifteen (15) parts of ammonium sulphate for one (1) part of manganese (Mn). A shallow depth of about twelve (12) inches at a temperature of 100° F. may be employed. The reduced ore is agitated in the solution and air is bubbled through it to effect removal of the ammonia and hence progress of the digestion. A rotary tube mill may be employed as a digester, and means provided for conserving the ammonia and air.

When the extraction is satisfactorily completed, or at any time during the process, liquor may be separated from solids. It contains manganous and ammonium sulphates and a trace of ammonia.

By adding ammonia and air to the solution so as to increase the concentration of ammonia an oxidation and precipitation takes place. Manganic hydrate is formed and the solution may be practically freed of soluble manganese compounds. The process also regenerates ammonium sulphate for further extractions. By operating successive batches the air and ammonia from a digestion may be passed into liquor from a previous digestion, using in the latter a condition favoring increase of ammonia concentraton, such as greater depth and/or lower temperature, and a precipitation effected. In other words the digestion and recovery steps may be made to effect opposite results, merely by a control of conditions.

In the drawing the process is diagrammatically represented. Ore or other material 10 containing manganese is reduced at 11 to form the manganous oxide. A digestive vessel 12 containing a shallow depth of liquor 13 and the solid 14 to be treated is provided with an injection pipe 15 for air. An exit 16 for air and ammonia leads to a precipitation vessel 17 which is kept cooler and/or has a greater depth of liquor 18. Liquor from the digestion is filtered at 19 forming tails 20, and the liquor 21 which feeds vessel 17. A precipitate 22 of manganese hydrate is formed. This is separated at 23 forming the solid product 24 and regenerated leaching liquor 25, which may be again used in the digester.

It will be understood that the process may be varied and employed in ways differing from this illustrative disclosure without in any way departng from the spirit and scope of the invention as expressed in the appended claims.

I claim:

1. The method of winning manganese values from material containing manganous oxide which comprises subjecting the material to the dissolving action of an ammonium salt solution whereby to form a soluble manganous salt and ammonia, maintaining a sufficiently low content of ammonia in the digestion to permit the digestion to proceed, injecting a gas which contains free oxygen into the digestion liquid for passage therethrough to aid in the removal of ammonia as it is formed in the digestion and to oxidize any ferrous impurites, and recovering the resulting solution of manganous salt.

2. The method of winning manganous values from material containing manganous oxide which comprises subjecting the material to the dissolving action of an ammonium salt solution whereby to form a soluble manganous salt and ammonia, maintaining a sufficiently low concentration of ammonia to allow the digestion to proceed, injecting air into the digestion liquid for passage therethrough to aid in the removal of ammonia as it is formed in the digestion and to oxidize any ferrous impurities, and recovering the resulting solution of manganous salt.

3. The method of winning manganese values from material containing manganous oxide which comprises subjecting the material to the dissolving action of an ammonium salt solution whereby to form a soluble manganous salt and ammonia, maintaining a sufficiently low concentration of ammonia to permit the digestion to proceed, injecting into the digestion mass for passage therethrough a gas containing free oxygen to aid in the removal of ammonia as it is formed in the digestion and to oxidize any ferrous impurities, conducting away the ammonia and gas leaving the sollution, recovering the solution of soluble manganous salt formed by the digestion, passing into said solution for absorption thereby gas and ammonia recovered from the digestion process, and recovering the resulting precipitated manganese hydrate.

4. The method of winning manganese values from material containing manganous oxide and ferrous oxide which comprises subjecting the material to the dissolving action of an ammonium salt solution whereby to form a solution containing manganous and ferrous salts and ammonia, maintaining a sufficiently low concentration of ammonia to permit the digestion to proceed, injecting a gas containing free oxygen into the solution for passage therethrough to aid in the removal of ammonia as it is formed in the digestion, thereby oxidizing the ferrous salt in preference to the manganous salt to a more highly oxidized state such that the low ammonia content of the solution effects precipitation of oxidized ferric salt, and recovering the manganous salt solution.

5. The method of winning manganese values from material containing manganous oxide which comprises subjecting the material to the dissolving action of an ammonium salt solution of approximately 10% concentration in a depth of about 12 inches of liquor and at a temperature not under about 100 degrees F., passing air through the digestion mass to effect removal of ammonia therefrom, separating solution containing dissolved values from the solid material of the digestion mass, and passing ammonia and air into said solution in a vessel providing a depth of liquor greater than about 12 inches.

WILSON BRADLEY.